(12) United States Patent
Castell Martínez

(10) Patent No.: US 8,994,205 B2
(45) Date of Patent: Mar. 31, 2015

(54) WIND TURBINE GENERATOR ROTOR MOUNTED UPON GENERATOR STATOR

(75) Inventor: Daniel Castell Martínez, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 115 days.

(21) Appl. No.: 13/387,209

(22) PCT Filed: Feb. 14, 2011

(86) PCT No.: PCT/EP2011/052153
§ 371 (c)(1),
(2), (4) Date: Jan. 26, 2012

(87) PCT Pub. No.: WO2012/007186
PCT Pub. Date: Jan. 19, 2012

(65) Prior Publication Data
US 2012/0161449 A1    Jun. 28, 2012

(30) Foreign Application Priority Data
Jul. 12, 2010   (EP) ................................. 10382190

(51) Int. Cl.
*F03D 9/00* (2006.01)
*F03D 11/02* (2006.01)

(52) U.S. Cl.
CPC ........... *F03D 11/028* (2013.01); *F05B 2260/96* (2013.01); *Y02E 10/725* (2013.01); *Y02E 10/722* (2013.01); *F05B 2220/7068* (2013.01)
USPC ............................................. 290/55; 290/44

(58) Field of Classification Search
USPC ................................................... 290/55, 44
See application file for complete search history.

(56) References Cited

U.S. PATENT DOCUMENTS

| | | | | |
|---|---|---|---|---|
| 7,042,109 | B2* | 5/2006 | Gabrys | 290/44 |
| 7,528,497 | B2* | 5/2009 | Bertolotti | 290/55 |
| 2006/0152014 | A1 | 7/2006 | Grant | |
| 2009/0026771 | A1* | 1/2009 | Bevington et al. | 290/55 |
| 2011/0143880 | A1* | 6/2011 | Minadeo et al. | 475/346 |
| 2011/0193349 | A1* | 8/2011 | Borgen et al. | 290/55 |
| 2011/0309631 | A1* | 12/2011 | Rebsdorf | 290/55 |
| 2012/0146337 | A1* | 6/2012 | Castell Martinez | 290/55 |
| 2013/0134712 | A1* | 5/2013 | Rodriguez Tsouroukdissian | 290/44 |

FOREIGN PATENT DOCUMENTS

| | | |
|---|---|---|
| DE | 10044262 | 3/2002 |
| DE | 10255745 | 6/2004 |
| DE | 102004030929 | 10/2005 |
| EP | 1855001 | 11/2007 |
| EP | 2172647 | 4/2010 |
| WO | 0159296 | 8/2001 |
| WO | 03023943 | 3/2003 |
| WO | 2005103489 | 11/2005 |
| WO | 2007119953 | 10/2007 |

* cited by examiner

Primary Examiner — Vanessa Girardi
(74) Attorney, Agent, or Firm — Squire Patton Boggs (US) LLP

(57) ABSTRACT

A wind turbine that includes a rotor, a generator, and a tower is described. The rotor includes a rotor hub and one or more rotor blades. The generator includes a generator stator and a generator rotor. The rotor hub is rotatably mounted on a frame and the generator and tower are arranged on the same side of the rotor. The generator stator is attached to the frame substantially in a plane perpendicular to the rotor's rotational axis, and the generator rotor is rotatably mounted on a part of the generator stator.

16 Claims, 3 Drawing Sheets

WIND TURBINE GENERATOR ROTOR MOUNTED UPON GENERATOR STATOR

CROSS-REFERENCE TO RELATED APPLICATIONS

This application claims priority to PCT Application No. PCT/EP2011/052153 entitled "Wind Turbine", filed Feb. 14, 2011 which claims priority to European Patent Application No. 10382190.6 entitled "Wind Turbine" filed Jul. 12, 2010 the disclosures of each of which are hereby incorporated herein in their entirety by reference.

BACKGROUND

Embodiments of the invention relate to a wind turbine. Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

Gearboxes form one of the most maintenance-intensive components of the wind turbine. They need to be inspected regularly and do not always fulfill their expected service life; the gearbox or some of its parts sometimes need to be replaced prematurely. This is due to the high loads and fluctuating loads to which a gearbox may be subjected. Particularly, the bending loads on the blades, which may be transmitted through the rotor shaft to the gearbox are damaging.

Direct drive wind turbines such as known from e.g. WO 2005/103489, do not suffer from the problems related to the gearbox. However, since there is no speed increase, the generator shaft rotates very slowly. As a consequence, a large and relatively expensive generator is generally needed to be able to generate electricity in an effective way. Additionally, when bending loads and movements (and corresponding deformations) are transmitted through the rotor shaft to the generator, it may not be possible to control the air gap between generator rotor and generator stator. High bending loads can even cause structural damage to parts of the generator, e.g. its bearings. Replacement or repair of such generator parts may be very expensive due to the size and related cost of the generator and its components.

Also in the case of more integrated direct drive wind turbine designs, which lack a rotor shaft and which have a direct coupling between the hub or its blades and the generator's rotor (known from e.g. DE 10255745), the bending moments and deformations are directly transmitted from the hub to the rotor and/or the stator, making it more difficult to minimize air gap variations.

The cause of the transmission of the bending loads and deformations from the blades and hub to the generator lies in the wind turbine configuration. In most conventional wind turbines, the rotor hub is mounted on one end of the rotor shaft. The rotor shaft is rotatably mounted in a support structure within the nacelle on top of the wind turbine tower. The rotor thus forms an overhanging structure which transmits torque, but additionally transmits cyclical bending loads due to the loads on the blades and the weight of the hub and blades. These bending loads are (in the case of direct drive turbines) transmitted to the generator causing air gap variations.

WO 01/59296 discloses a direct drive wind turbine comprising a hub with a plurality of blades, the hub being rotatably mounted relative to an axle part. The hub of the turbine is connected to the generator rotor by means of a plurality of connecting members, which are torsion stiff but yielding to bending moments. The generator may have an elongated ring-shaped element upon which the bearings supporting the generator rotor are provided. In other embodiments, the bearings are directly provided upon the frame.

With this kind of configuration the loads due to the weight of hub and blades are transmitted more directly via the frame to the tower, whereas the rotor transmits mainly torque to the generator, thus substantially reducing (but not completely avoiding) undesired deformations in the generator. This may mean improvement with respect to other prior art wind turbines, but air gap instability can still be a problem. Bending loads that are transmitted into the frame can cause deformations within the frame. Since the deformations along the length of the frame may vary under bending, the displacements experienced by the bearings of the rotor may vary. Also, the displacements experienced by the stator may be different from the displacements experienced by the rotor, thus causing air gap instability and deformations within the generator.

DE 10 2004 030 929 discloses a wind turbine with a nacelle, a rotor that is attached to the nacelle, and a generator comprising a generator stator and a generator rotor, wherein the generator rotor is coupled to the rotor and the generator is arranged on the opposite side of the nacelle with respect to the rotor.

At least one disadvantage associated with this configuration is the occurrence of high bending loads in the wind turbine tower. In larger offshore wind turbines, the weight of a generator may be close to or equal to the weight of a rotor. The rotor, with its long blades, will have to be arranged a minimum distance away from the tower to avoid the blades hitting the tower. By arranging the generator even further away from the tower, the bending loads in the tower may be very high.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

In a first aspect, the invention provides a wind turbine comprising a rotor, a generator and a tower, the rotor comprising a rotor hub and one or more rotor blades and the generator comprising a generator stator and a generator rotor, wherein the rotor hub is rotatably mounted on a frame and the generator and tower are arranged on the same side of the rotor, and the generator stator is attached to the frame substantially in a plane perpendicular to the rotor's rotational axis, and wherein the generator rotor is rotatably mounted on a part of the generator stator. Bending deformations experienced by the frame may vary particularly along the rotor's rotational axis (i.e. the frame's longitudinal axis). However, in a plane perpendicular to the rotational axis, these deformations will vary to a much lesser extent. Deformations of the frame will thus generally lead to a displacement (but not to a deformation) of the stator. Additionally, there is no direct contact between the generator rotor and the frame; the generator rotor is rotatably mounted on a part of the stator instead. In this aspect of the invention, the generator rotor will thus experience the same displacement as the generator stator. This will improve the air gap stability, since there is no relative displacement of the generator rotor with respect to the generator stator.

In some embodiments, the generator rotor may be rotatably mounted on the generator stator through two bearings. In other embodiments, the generator rotor may be rotatably mounted on the generator stator through a single bearing.

In some embodiments, the frame comprises at least two separate sections. For example, the frame may comprise a front frame and a rear frame, wherein the hub may be rotatably mounted on the front frame, and the rear frame may be rotatably mounted on a wind turbine tower. A single frame mounted upon the tower, carrying both the rotor hub and generator may be provided or such a frame may be split in two or more parts. A frame with two or more separate sections may have benefits during the installation of the wind turbine and may simplify manufacture. In these embodiments, the generator stator may be mounted either on the front or rear frame (or middle frame if provided), depending on the particular frame structure. In some embodiments, the frame comprises a front frame, middle frame and rear frame, and the hub is rotatably mounted on the front frame, the generator is mounted on the middle frame, and the rear frame is rotatably mounted on a wind turbine tower. These embodiments may have advantages with respect to the installation of the generator and middle frame.

In some embodiments, torque is transmitted from the rotor to the generator rotor through a flexible coupling that substantially limits the transfer of bending loads. In these embodiments, the bending loads may be reduced significantly in the generator rotor. Combined with the fact that any deformations that may occur in the frame do not result in substantial deformations in the generator, air gap instability may be reduced in a very significant way.

In some embodiments, one or more circumferentially arranged substantially axial protrusions are attached to the rotor, and the axial protrusions extend into the generator rotor carrying structure, and one or more flexible elements are arranged between one or more of the axial protrusions and the carrying structure. Optionally, the axial protrusions may be connected to or integrally formed with the rotor hub or extenders. Optionally, a coupling body is connected to the rotor hub, the coupling body comprising the axial protrusions. The flexible elements may e.g. be made from elastic or visco-elastic material.

There are various ways in which a flexible coupling which transmits torque but substantially limits the transfer of bending loads can be provided. One preferred option is through protrusions attached to the hub that extend into a generator rotor carrying structure. Flexible elements may be provided to connect the protrusions to the rotor carrying structure. These flexible elements may take any suitable form and may derive their flexibility e.g. from their shape, material, positioning, mounting or combinations of these. They may be made from any suitable material, e.g. elastic or elastomer materials, or combinations of metals with elastomers or yet other suitable materials. Due to the arrangement of protrusions from the rotor extending into the generator rotor structure, the hub may be positioned closer to the tower, thus also reducing loads in the tower.

DESCRIPTION OF THE DRAWINGS

Particular embodiments of the invention will be described in the following, only by way of non-limiting examples, with reference to the appended drawings, in which.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 1:
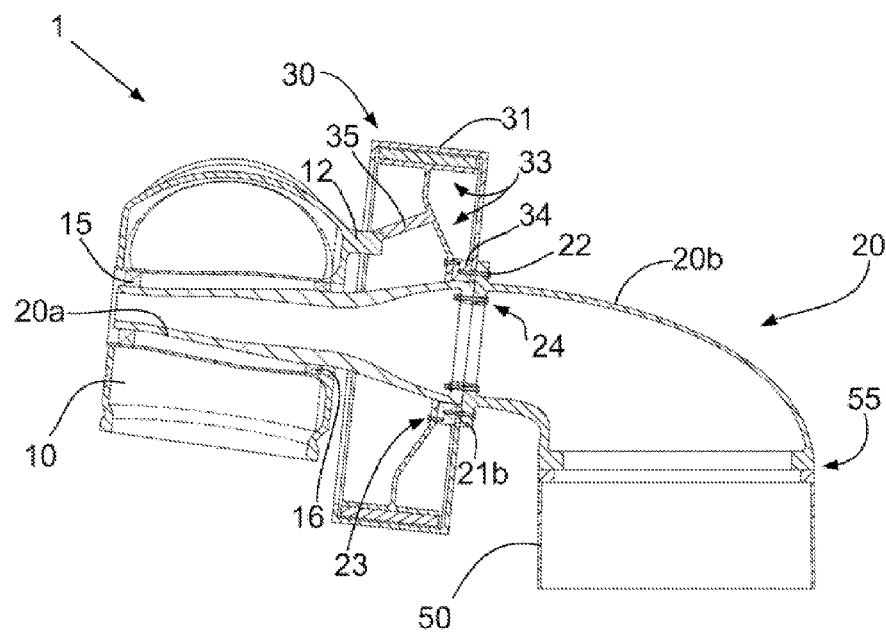
FIG. 1 illustrates a first wind turbine in accordance with an embodiment of the invention.

FIG. 1 illustrates a first embodiment of a wind turbine 1 according to the invention. Wind turbine 1 comprises a tower 50 upon which a frame 20 is rotatably mounted. In this embodiment, frame 20 comprises two separate sections: a front frame 20a and a rear frame 20b. Reference sign 55 indicates the presence of a yaw mechanism, which allows rear frame 20b to be rotated around the longitudinal axis of the wind turbine tower. Rear frame 20b and front frame 20a comprise inward annular flanges. Bolts 24 may be used to connect these flanges.

Rotor hub 10 is rotatably mounted on front frame 20a through bearings 15 and 16. Rotor hub 10 carries a plurality of blades (not shown). A generator 30 is also mounted on frame 20. Generator housing 31 is connected through bolts 22 to an annular flange 21b provided on rear frame 20b. The generator stator is thus connected to the frame in a plane substantially perpendicular to the rotor's rotational axis. Schematically indicated with reference sign 34 is a suitable bearing, rotatably supporting a generator rotor 33. Any suitable bearing may be used.

Generator rotor 33 comprises (electro)magnetic means, which may include but are not limited to e.g. permanent magnets or windings. These (electro)magnetic means are carried by a carrying structure 35, which is connected to the bearing 34 and thus can rotate with respect to the generator stator.

A protrusion 12 is integrally formed with hub 10. The protrusion 12 may be flexibly coupled to generator rotor carrying structure 35, thus limiting the transfer of bending loads. In some embodiments, this connection may also be rigid.

The connection of the stator in a plane perpendicular to the rotor's rotational axis, in combination with the lack of a direct connection between the generator rotor and the frame may reduce the air gap instability. A further reduction of air gap instability may be achieved with a flexible coupling between rotor and generator rotor, substantially avoiding the transfer of hub displacements and deformations to the generator rotor.

All connections shown in this embodiment were schematically indicated with bolts, but it will be clear that many other fastening methods may also be used.

Figure 2:
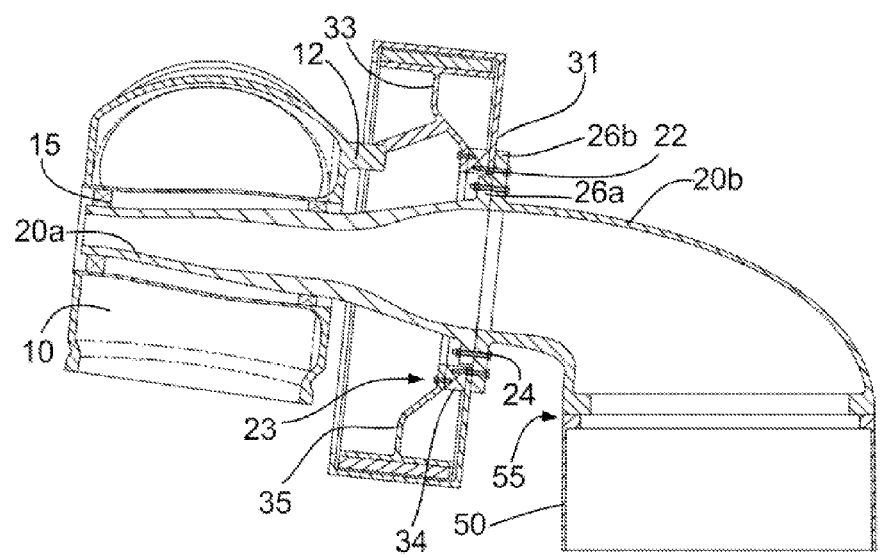
FIG. 2 illustrates a second wind turbine in accordance with an embodiment of the invention.

FIG. 2 schematically illustrates a second embodiment of a wind turbine according to the invention. Outward annular flanges 26a and 26b are provided to connect front frame 20a and rear frame 20b using bolts 24. A single bearing connected to rear frame 20b using a fastener 22 is again provided. The bearing rotatably supports generator rotor 33.

In an alternative embodiment, the bearing 34 may be connected e.g. to flange 26a of front frame 20a.

Figure 3:
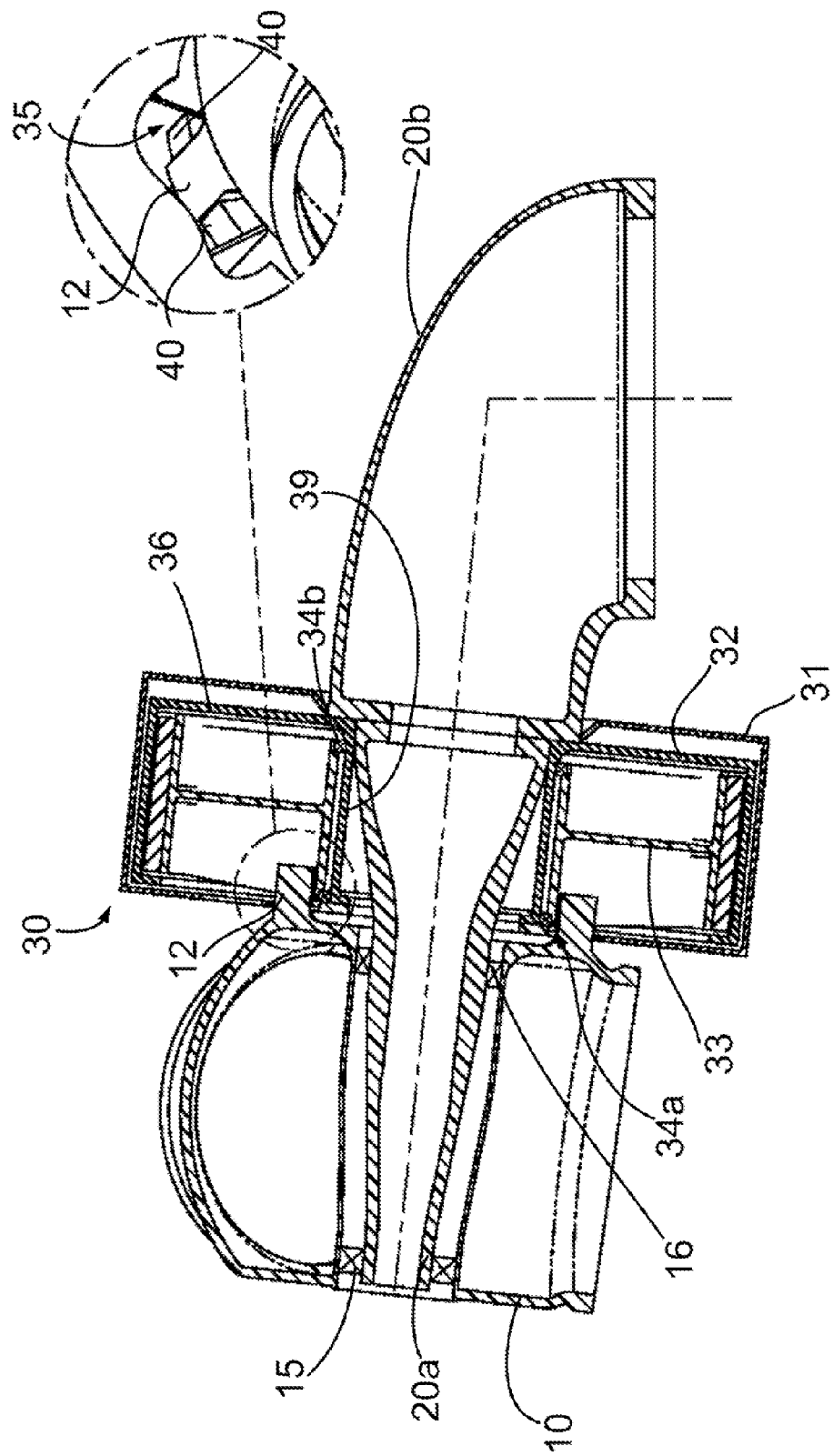
FIG. 3 illustrates a third wind turbine in accordance with an embodiment of the invention.

FIG. 3 illustrates a further alternative. In contrast to the previous embodiments shown, generator rotor 33 is rotatably supported upon stator 32 using two bearings 34a and 34b. The generator stator 32 is once again connected to rear frame 20b in a plane substantially perpendicular to the rotor's rotational axis. A radially extending part 36 which forms part of the stator structure carrying (electro)magnetic means, may be used to connect to the frame.

An annular base 39 extends forwardly from this connection supporting bearings 34a and 34b. A generator housing 31 is arranged around the generator stator 32.

Also illustrated in FIG. 3 is an example of how a flexible (e.g. elastic or elastomer) element may be provided to connect protrusions integrally formed or connected with the hub with a generator rotor carrying structure 35. This is just one example of a number of alternative ways in which a flexible coupling may be provided.

Figure 4:
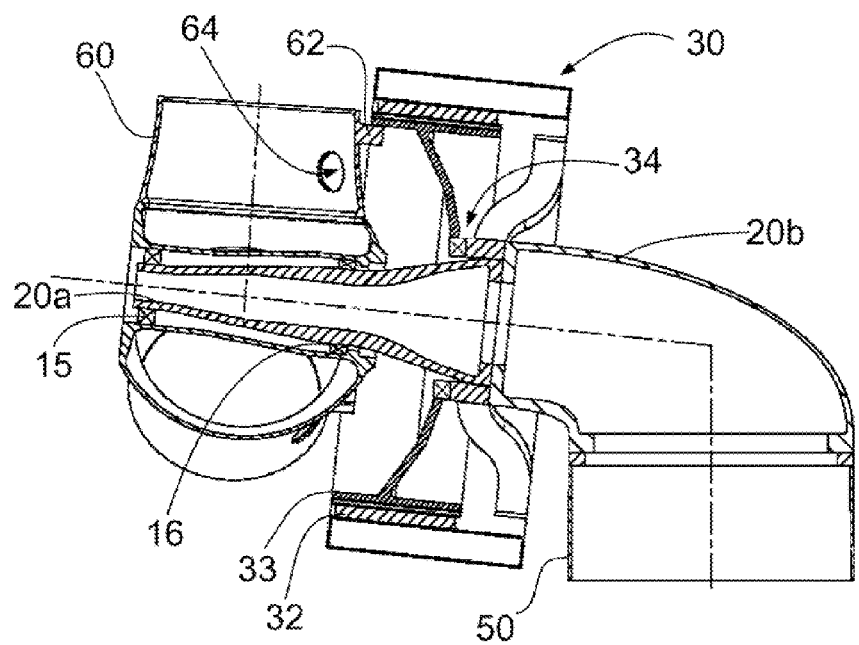
FIG. 4 illustrates a fourth wind turbine in accordance with an embodiment of the invention.

FIG. 4 illustrates a further embodiment in which protrusions 62 may have been provided on extenders 60. Extenders are elements that serve to increase the rotor diameter without increasing the rotor blade length. Roots of the rotor blades (not shown) may be attached at the edge of the extender. Inspection holes 64 may be provided to inspect the flexible couplings between protrusions 62 and a suitable part of the generator rotor.

In yet further embodiments, protrusions may also be provided on a coupling body (i.e. a separate component) which may be connected to the hub.

Figure 5:
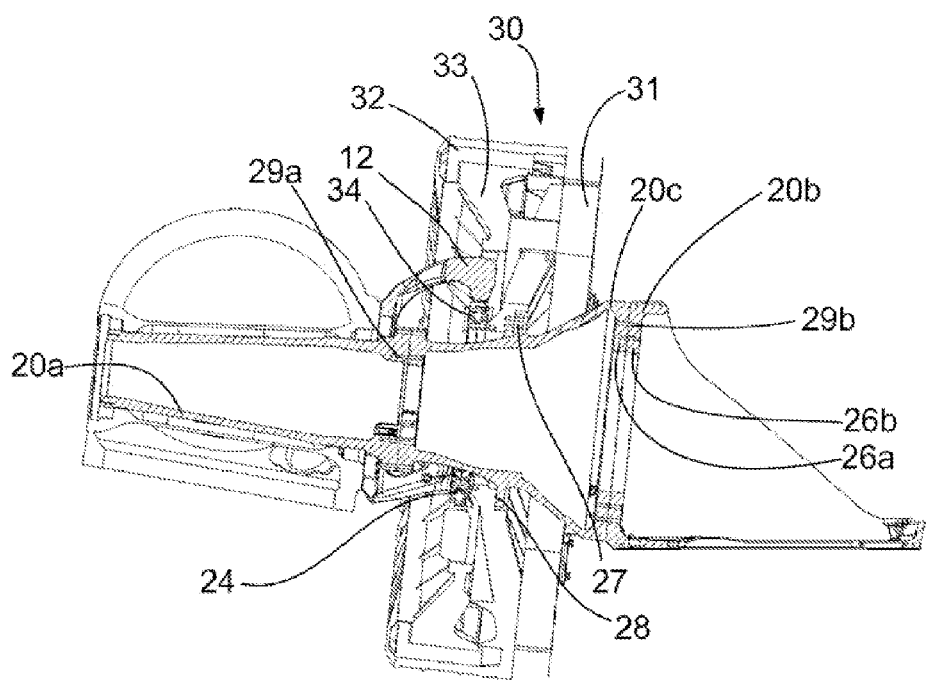
FIG. 5 illustrates a fifth wind turbine in accordance with an embodiment of the invention.

Finally, FIG. 5 illustrates a further embodiment, in which a frame comprising a front frame 20a, a rear frame 20b and a middle frame 20c. In this embodiment, middle frame 20c is adapted to carry out generator 30. Middle frame 20c furthermore has substantially the same length as the generator. An aspect of providing a frame (section) dedicated principally to carrying the generator is that this particular frame (section) and generator may be preassembled together; subsequently they may be assembled with the rear frame 20b. Installation of the wind turbine may thus be simplified.

Rear frame 20b and middle frame 20c comprise suitable inward annular mounting flanges 26b and 26a respectively. These flanges 26a and 26b may be connected using a plurality of bolts 29b.

Middle frame 20c furthermore comprises inward and outward mounting flanges at its forward end. Front frame 20a comprises corresponding mounting flanges. The front frame 20a and middle frame 20c may thus be connected using suitable bolts 29a.

Middle frame 20c further comprises an outward mounting flange 27 at a central portion. Bolts 28 may be used to connect this mounting flange to generator stator 32. Similarly as in FIG. 3, the generator stator may comprise a forward extending annular base upon which the generator rotor 33 is mounted. In this embodiment, a single bearing 35 is used.

Similarly as in the embodiments of FIGS. 1-4, a substantially flexible coupling for transmitting the torque from the rotor to the generator rotor while substantially limiting the transfer of bending loads may be provided. Circumferentially arranged substantially axial protrusions 12 are attached to the rotor hub, and these axial protrusions extend into the generator rotor carrying structure, and one or more flexible elements may be arranged between the axial protrusions and the carrying structure.

In accordance with this embodiment, the generator stator is thus attached to the frame substantially in a plane perpendicular to the rotor's rotational axis, and the generator rotor is rotatably mounted on a part of the generator stator. Deformations of the generator may thus be avoided or reduced.

The invention is not limited in any way to the kind of bearings used to mount the hub on the frame or to mount the generator rotor on the generator stator. Suitable fluid bearings, particularly hydrodynamic or hydrostatic bearings, may be employed. Alternatively, suitable rolling element bearings, such as e.g. roller bearings, double-tapered roller bearings, or ball bearings may also be used. The bearings may further be purely radial bearings or radial and axial bearings.

The invention is furthermore not limited in any way to the kind of generator employed in the wind turbine. Any suitable kind of synchronous or asynchronous generator may be used. In one preferred embodiment of the invention, the generator rotor is provided with permanent magnets. The generator stator may be arranged radially outside the generator rotor. In other embodiments, the generator rotor may be arranged radially outside the generator stator, or the rotor and stator may e.g. be axially arranged.

Also the frame supporting the rotor hub and generator may be formed of one integral part or may comprise two or more separate parts. The frame comprising a plurality of separate parts may have advantages for the installation of the wind turbine. The frame may furthermore be of any suitable shape and configuration: the frame may e.g. have a circular, elliptical, rectangular or other cross-section. The frame may be a forged component but may also be formed by e.g. a plurality of beams or a suitable truss structure.

Although this invention has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular disclosed embodiments described before, but should be determined only by a fair reading of the claims that follow.

I claim:

1. A wind turbine comprising:
a frame, having a longitudinal axis, that extends within a rotor and a generator, wherein the rotor includes a rotor hub and one or more rotor blades, the rotor hub being rotatably mounted on the frame at two points along the longitudinal axis of the frame; and
the generator includes a generator stator and a generator rotor, the generator being arranged on a first side of the rotor, the generator stator being attached to the frame substantially in a plane perpendicular to a rotational axis of the rotor, and the generator rotor being rotatably mounted on a part of the generator stator;
the wind turbine further comprising a tower being arranged on the first side of the rotor; and
a flexible coupling that transmits the torque from the rotor to the generator rotor while substantially limiting the transfer of bending loads.

2. The wind turbine according to claim 1, wherein the generator rotor is rotatably mounted on the generator stator through two bearings.

3. The wind turbine according to claim 1, wherein the generator rotor is rotatably mounted on the generator stator through a single bearing.

4. The wind turbine according to claim 3, wherein the single bearing is a double tapered roller bearing.

5. The wind turbine according to claim 1, wherein the frame comprises at least two separate frame sections.

6. The wind turbine according to claim 5, wherein the frame comprises a front frame and a rear frame, and wherein the hub is rotatably mounted on the front frame, and the rear frame is rotatably mounted on the wind turbine tower.

7. The wind turbine according to claim 6, wherein the generator stator is mounted on the rear frame.

8. The wind turbine according to claim 5, wherein the frame comprises a front frame, middle frame and rear frame, and wherein the hub is rotatably mounted on the front frame, the generator is mounted on the middle frame, and the rear frame is rotatably mounted on the wind turbine tower.

9. The wind turbine according to claim 8, wherein the middle frame has substantially the same length as the generator.

10. The wind turbine according to claim 1, wherein one or more circumferentially arranged and substantially axial protrusions are attached to the rotor, the axial protrusions extend into a generator rotor carrying structure, and one or more flexible elements are arranged between one or more of the axial protrusions and the carrying structure.

11. The wind turbine according to claim 10, wherein the axial protrusions are connected to or integrally formed with the rotor hub.

12. The wind turbine according to claim 10, wherein the one or more blades are connected to the rotor hub with extenders, and the axial protrusions are connected to or integrally formed with the extenders.

13. The wind turbine according to claim 10, wherein a coupling body is connected to the rotor hub, the coupling body comprising the axial protrusions.

14. The wind turbine according to claim 10, wherein the flexible elements are made from elastic or visco-elastic material.

15. The wind turbine according to any claim 10, wherein the generator rotor is arranged radially inside of the generator stator.

16. The wind turbine according to claim 15, wherein the generator rotor carries a plurality of permanent magnets.

* * * * *